US012654894B2

(12) United States Patent
  Streu et al.

(10) Patent No.: US 12,654,894 B2
(45) Date of Patent: Jun. 16, 2026

(54) LOADING DEVICE WITH A PORTIONING UNIT AND OPERATING METHOD

(71) Applicant: VEMAG Maschinenbau GmbH, Verden (DE)

(72) Inventors: Nico Streu, Ahausen (DE); Marco Horn, Walsrode (DE); Achim Warnke, Syke (DE); Uwe Flammann, Kirchlinteln (DE)

(73) Assignee: VEMAG Maschinenbau GmbH, Verden (DE)

( * ) Notice: Subject to any disclaimer, the term of this patent is extended or adjusted under 35 U.S.C. 154(b) by 335 days.

(21) Appl. No.: 18/512,907

(22) Filed: Nov. 17, 2023

(65) Prior Publication Data

US 2024/0166391 A1 May 23, 2024

(30) Foreign Application Priority Data

Nov. 18, 2022 (DE) .......................... 102022130581.3

(51) Int. Cl.
  B65B 43/52 (2006.01)
  B65B 35/12 (2006.01)
  (Continued)

(52) U.S. Cl.
  CPC .............. B65B 43/52 (2013.01); B65B 35/12 (2013.01); B65B 35/24 (2013.01); B65B 57/04 (2013.01);
  (Continued)

(58) Field of Classification Search
  CPC ......... B65B 35/24; B65B 35/12; B65B 35/36; B65B 43/46; B65B 43/52; B65B 7/162; B65B 57/04
  (Continued)

(56) References Cited

U.S. PATENT DOCUMENTS 4,428,179 A    1/1984  Jordan et al.
5,092,414 A *  3/1992  Blezard .................. G01G 15/00
                                              177/52
(Continued)

FOREIGN PATENT DOCUMENTS

DE    102004023473 A1   12/2005
DE    102004023474 A1   12/2005
(Continued)

OTHER PUBLICATIONS

German Patent Office, Examination Report in related German Patent Application No. 10 2022 130 581.3 dated Dec. 15, 2023; 10 pages (with English Translation).
(Continued)

*Primary Examiner* — James R Bidwell
(74) *Attorney, Agent, or Firm* — Wood Herron & Evans LLP

(57) ABSTRACT

A loading device is provided for portioning food products into trays, including a feeder belt for receiving and conveying food products into a transfer zone; a conveyor belt for conveying the trays conveying direction into a loading zone below the transfer zone; and a portioning unit for portioning the food products into the trays. The portioning unit has a first and a second constraining mechanism which are configured to be driven, in each case parallel to the conveying direction and orthogonally to the conveying direction, so as to come sequentially into contact with a tray being moved into the loading zone, in such a way that the movement of the tray is constrained at at least one position in the loading zone. A portioning unit and a method of operating a loading device are also provided.

16 Claims, 6 Drawing Sheets

(51) Int. Cl.

| | | |
|---|---|---|
| *B65B 35/24* | (2006.01) | |
| *B65B 57/04* | (2006.01) | |
| *B65B 59/00* | (2006.01) | |
| *B65B 65/02* | (2006.01) | |

(52) U.S. Cl.
CPC .......... *B65B 59/003* (2019.05); *B65B 59/005* (2013.01); *B65B 65/02* (2013.01); *B65G 2201/0202* (2013.01); *B65G 2201/0258* (2013.01)

(58) Field of Classification Search
USPC ....................................................... 198/459.7
See application file for complete search history.

(56) References Cited

U.S. PATENT DOCUMENTS

| | | | | |
|---|---|---|---|---|
| 7,069,845 | B2 * | 7/2006 | Righele | B65B 57/06 99/441 |
| 11,286,075 | B2 * | 3/2022 | Grasselli | B65B 5/068 |
| 11,401,067 | B2 | 8/2022 | Gabler et al. | |
| 2005/0268579 | A1 * | 12/2005 | Natterer | B65B 7/164 53/553 |
| 2013/0227914 | A1 | 9/2013 | Allgaier et al. | |
| 2013/0291483 | A1 * | 11/2013 | Van Gerwen | A22C 7/0069 53/113 |
| 2014/0037402 | A1 | 2/2014 | Ickert et al. | |
| 2014/0069054 | A1 | 3/2014 | Gabler | |
| 2018/0206510 | A1 | 7/2018 | Greif et al. | |
| 2022/0400538 | A1 * | 12/2022 | Napravnik | B29C 65/18 |

FOREIGN PATENT DOCUMENTS

| | | | | |
|---|---|---|---|---|
| DE | 102012004372 | A1 | 9/2013 | |
| DE | 102012015401 | A1 | 2/2014 | |
| DE | 102016108003 | A1 | 11/2017 | |
| DE | 102017101464 | A1 | 7/2018 | |
| EP | 2464588 | B1 | 1/2014 | |
| EP | 2706013 | A1 | 3/2014 | |
| EP | 2894101 | B1 | 10/2018 | |
| JP | S57174312 | U | 11/1982 | |
| JP | H0737249 | B2 | 4/1995 | |
| WO | 2007049145 | A1 | 5/2007 | |
| WO | WO-2017148910 | A1 * | 9/2017 | A22C 17/0093 |

OTHER PUBLICATIONS

European Patent Office, Search Report in related European Patent Application No. 23210674.0-1014 dated May 13, 2024, 9 pages.
German Patent Office; Examination Report in related German Patent Application No. 10 2022 130 581.3 dated Jul. 7, 2023; 5 pages.
German Patent Office; English-language Translation of Examination Report in related German Patent Application No. 10 2022 130 581.3 dated Jul. 7, 2023; 5 pages.

* cited by examiner

1000

1500

LOADING DEVICE WITH A PORTIONING UNIT AND OPERATING METHOD

CROSS-REFERENCE TO RELATED APPLICATION

This application claims priority to, German Application Number 10 2022 130 581.3 filed Nov. 18, 2022, with the same title as listed above. The above-mentioned patent application is incorporated herein by reference in its entirety.

TECHNICAL FIELD

This application relates to a loading device for placing food products into trays, comprising a feeder belt which is configured to receive food products and to convey the food products into a transfer zone, and a conveyor belt which is designed to move trays in a conveying direction and to convey the trays into a loading zone below the transfer zone. The feeder belt is designed to transfer the food products in the transfer zone to the trays in the loading zone. The loading device also includes a portioning unit which is designed to selectively interrupt the movement of the trays in the loading zone.

BACKGROUND

Loading devices of the kind initially specified are generally known from the prior art. They are used in food production to place or position food products in trays. The trays receive the food products while being moved into or through a transfer zone. To transfer the food products to the trays in the transfer zone in a controlled manner, the movement of the trays is constrained, i.e., temporarily interrupted or slowed down. This ensures that the trays remain in a defined position.

The tray needs to be slowed down or stopped in a controlled manner at two or more predefined positions, so as to be able to place two or more portions of a food product into the tray in a controlled manner. In that regard, portioning units are already known from the prior art that momentarily interrupt the movement of the trays at a predefined position. However, the size of the trays and the number of food products that can be placed or portioned in a controlled manner is still limited.

There is therefore a need for a portioning device that allows a variable number of food products to be placed in trays having different dimensions.

SUMMARY

The object of the present invention is therefore to increase the flexibility of a loading device of the kind initially specified in respect of the number of portions to be received in a tray and in respect of the geometry of the trays.

In a first aspect, the invention achieves the object specified above by means of a loading device. The invention proposes that the portioning unit has a first constraining mechanism and a second constraining mechanism which are configured to be driven, in each case parallel to the conveying direction and orthogonally to the conveying direction, so as to come sequentially into contact with a tray being moved into the loading zone, in such a way that the movement of the tray is constrained at at least one position in the loading zone. Due to the first and second constraining mechanism being drivable parallel to the conveying direction—i.e., in the conveying direction and in the opposite direction thereto—, the constraining mechanisms can be moved parallel to the conveying direction to different positions, depending on the geometry of the tray and the number of portions. As the first constraining mechanism and the second constraining mechanism can also be driven orthogonally to the conveying direction, they can be moved into the path of the trays in such a way that they come sequentially into contact with the trays in the loading zone at at least one position. By coming into contact in this way, the movement of the trays is constrained at at least one position in the loading zone. Constraining their movement is to be understood here to mean that the path or movement of the trays is opposed by a resistance and that the trays are slowed down or brought to a standstill as a result. The portioning unit is therefore no longer limited in terms of the positions at which the movement of the trays is interrupted, but allows flexibility in positioning the food products. By means of the constraining mechanisms that can be moved parallel to the conveying direction, it is also possible to move the trays in the opposite direction to the conveying direction, so that two food products can be placed one on top of the other, for example.

A tray within the meaning of the invention is to be understood as a receiving means of any kind, which also includes platters or dishes suitable for being conveyed on an appropriate conveyor belt and being loaded with a food product.

The conveyor belt is preferably configured to convey the trays in a conveying plane, the portioning unit being arranged below the conveying plane. It is further preferred that the first constraining mechanism and the second constraining mechanism are configured to be driven orthogonally to the conveying direction for selective movement into the conveying plane. In other words, the first constraining mechanism and the second constraining mechanism move from a position below the conveying plane, in which the trays are conveyed, into the conveying plane and thus come into contact with a tray which is being moved through the loading zone. By coming into contact in this way, the movement of the trays is constrained accordingly. The arrangement of the portioning unit below the conveying plane allows trays with different geometries to be used, without, for example, the width of the trays being restricted by the arrangement of the portioning unit.

It is further preferred that the portioning unit has at least one drive which is configured to drive the first constraining mechanism and/or the second constraining mechanism parallel to the conveying direction. In contrast to a mere restoring element, such as a spring mechanism, a drive allows the first constraining mechanism and/or the second constraining mechanism to be moved in a controlled driven manner. Preferably, the drive includes a first drive which is configured to drive the first constraining mechanism, and the portioning unit also has a second drive which is configured to drive the second constraining mechanism parallel to the conveying direction. The first constraining mechanism and the second constraining mechanism can therefore be driven independently of each other.

It is further preferred that the drive has a motor and a continuously variable transmission that co-operates with the motor. A continuously variable transmission allows the first constraining mechanism and/or the second constraining mechanism to be controlled in a flexible manner and thus allows the trays in the loading zone to be constrained in a flexible and tailored manner. The food products can thus be placed and portioned into the trays more precisely by using the constraining mechanisms to constrain the movement of the trays appropriately in a continuously variable manner.

The continuously variable transmission preferably includes a gear wheel drive co-operating with the motor, for driving a threaded spindle operatively connected to the first constraining mechanism and/or the second constraining mechanism. A threaded spindle that co-operates with a gear wheel drive allows a rotational movement of the gear wheel to be translated into a linear movement of the threaded spindle and of a constraining mechanism in engagement with the threaded spindle.

Preferably, the threaded spindle is a first threaded spindle and in engagement with the first constraining mechanism, and the portioning unit also includes a second threaded spindle in engagement with the second constraining mechanism, the gear wheel drive being designed to drive the first threaded spindle and the second threaded spindle in opposite directions. A single motor can thus be used to drive the gear wheel drive. The gear wheel drive engages the first threaded spindle and the second threaded spindle in such a way that they are driven in opposite directions. This allows the first constraining mechanism and the second constraining mechanism to engage alternately with a tray moving into the loading zone. For example, the first constraining mechanism can engage at a first, second and third position with a first tray moving into the loading zone, then move back to the first position in the opposite direction to the conveying direction, while the second constraining mechanism driven in the opposite direction is now moved in the conveying direction and engages at the first, second position and third position with a second tray. If the second constraining mechanism is then moved back to the first position in the opposite direction to the conveying direction, the first constraining mechanism can be moved in the conveying direction from the first position as far as the third position and then come into contact with a third tray at the respective positions.

According to a preferred alternative, the continuously variable transmission has a toothed belt drive operatively connected to the first constraining mechanism and/or the second constraining mechanism. A toothed belt drive allows the position of the first constraining mechanism and/or the second constraining mechanism, which are operatively connected to the corresponding toothed belt, to be controlled in an continuously variable manner.

It is further preferred that the portioning unit has at least one lifting unit which is configured to drive the first constraining mechanism and/or the second constraining mechanism orthogonally to the conveying direction. The portioning unit is arranged in such a way that the first constraining mechanism and/or the second constraining mechanism are moved laterally transversely to the conveying direction into the path of a tray, for example. Alternatively or additionally, at least one constraining mechanism is arranged below the conveying plane or above the conveying plane and is thus moved in the vertical direction into the path of the trays. A lifting unit allows the constraining mechanism to be moved linearly by a short distance to bring it into contact with the respective trays. Such a lifting unit configured to apply a force to the first constraining mechanism and/or the second constraining mechanism in order to perform a linear movement can be of simple constructional design.

Preferably, the lifting unit is a first lifting unit configured to drive the first constraining mechanism, and the portioning unit also has a second lifting unit configured to drive the second constraining mechanism orthogonally to the conveying direction. Two independent lifting units respectively assigned to the first constraining mechanism and the second constraining mechanism allow the constraining mechanisms to be spaced spatially apart from each other, thus allowing greater flexibility in the design of the loading devices and in particular of the portioning unit. Controlling the stroke of the first constraining mechanism and the second constraining mechanism independently of each other also allows greater flexibility.

It is further preferred that the lifting unit has an actuator, in particular a pneumatic cylinder, the first constraining mechanism and/or the second constraining mechanism also having a tappet which co-operates with the actuator and can be moved by the actuator orthogonally to the conveying direction, in particular into the conveying plane. Such an actuator and tappet co-operating with the actuator makes it simple to apply a lifting movement that allows the constraining mechanism and in particular the tappet of the respective constraining mechanism to be brought into contact with the trays.

It is further preferred that the loading device includes a control unit in control communication with the portioning unit and configured to control the movement of the first constraining mechanism and the second constraining mechanism parallel to the conveying direction and/or orthogonally to the conveying direction. The first constraining mechanism and/or the second constraining mechanism can thus be controlled and co-ordinated with each other not only in the conveying direction, but also orthogonally to the conveying direction. The control unit is preferably also configured to control the feeder belt and/or the conveyor belt. Control of the feeder belt and/or the conveyor belt can thus be co-ordinated with control of the first constraining mechanism and/or the second constraining mechanism. The precision with which the food products are portioned and placed into the trays is thus increased. The control unit is preferably a central control unit, therefore.

It is further preferred that the loading device further comprises at least one sensor connected to the control unit and configured to detect a tray moving into the loading zone. Control of the constraining mechanism is thus co-ordinated with the exact position of the trays in the loading zone, with movement being detected by the sensor. In particular, the movement of the first constraining mechanism and/or the second constraining mechanism orthogonally to the conveying direction, which results in them actually coming into contact with the trays, can therefore be performed in a targeted manner, and the conveying speed of the loading device as a whole can be increased by the more precise control. The sensor is preferably configured to detect the tray moving into the loading zone by detecting a distance between two adjacent trays in the loading zone.

It is further preferred that the control unit is configured to operate the first constraining mechanism and the second constraining mechanism in one, several or all of the following operating modes, depending on the number of food products to be portioned:

in a first operating mode in which the first constraining mechanism interrupts and/or constrains the movement of a tray being moved into the loading zone at a first position for receiving a food product, in the event that a food product is to be portioned into the tray;

in a second operating mode in which the first constraining mechanism interrupts and/or constrains the movement of a first tray at a first position for receiving a first food product, and the second constraining mechanism interrupts and/or constrains the movement of the first tray at a second position for receiving a second food product, in the event that two food products are to be portioned into the tray;

in a third operating mode in which the first constraining mechanism interrupts and/or constrains, in a predefined number of cycles, the movement of a first tray at a number of positions for receiving a corresponding number of food products, and the second constraining mechanism interrupts and/or constrains, in a predefined number of cycles, the movement of a second tray at a number of positions for receiving a corresponding number of food products, in the event that a plurality of food products are to be portioned into the tray; and in a fourth operating mode in which the first constraining mechanism is moved in the conveying direction at a predefined speed which is slower than a conveying speed of the conveyor belt, and which continuously constrains the movement of a tray being moved into the loading zone, in such a way that a plurality of food products is received in the tray.

The portioning device thus allows the first constraining mechanism and the second constraining mechanism to be controlled in a targeted manner, for example for portioning food products in the form of long strands, or for portioning a plurality of portions a close distance apart, for each of which the fourth operating mode is suitable, or for portioning food products comprising two or more spaced-apart portions in a tray, for which the third operating mode is particularly suitable. It is also possible to portion only one portion, for which operation in the first operating mode is suitable.

The conveyor belt preferably includes a first belt section and a second belt section which is spaced apart from the first belt section in the conveying plane orthogonally to the conveying direction, the portioning unit being arranged, at least in sections thereof, between the first belt section and the second belt section. The first belt section and the second belt section extend parallel to each other. Due to the arrangement of the portioning unit, in particular the first and second constraining mechanism, between the first belt section and the second belt section, the conveyor belt is not hindered in its movement by the portioning unit, yet at the same time the constraining mechanisms can come into contact with the trays unhindered.

According to a second aspect, the invention achieves the object initially specified by means of a portioning unit for a loading device for portioning food products into trays, in particular for a loading device according to the first aspect of the invention. The portioning unit according to the second aspect of the invention is designed for portioning food products into trays in a loading zone. The portioning unit achieves the object initially specified by the portioning unit having a first constraining mechanism and a second constraining mechanism which are configured to be driven, in each case parallel to the conveying direction and orthogonally to the conveying direction, so as to come sequentially into contact with a tray being moved into the loading zone, in such a way that the movement of the tray is constrained at at least one position in the loading zone. A portioning unit according to the second aspect of the invention utilizes the advantages initially mentioned in connection with the first aspect of the invention. Advantages and preferred embodiments of the portioning unit for a loading device according to the first aspect of the invention are likewise advantages and preferred embodiments of the portioning unit according to the second aspect of the invention.

A third aspect of the invention relates to a method of operating a loading device for portioning food products into trays, in particular a method of operating a loading device according to the first aspect of the invention. The method according to the third aspect achieves the object initially specified by comprising the steps of:

receiving food products on a feeder belt;
conveying the food products into a transfer zone;
driving a conveyor belt in a conveying direction to receive trays;
moving the trays into a loading zone by means of the conveyor belt arranged below the transfer zone, wherein the food products in the transfer zone are transferred to the trays conveyed by the conveyor belt; and
selectively constraining the movement of a respective tray being moved into the loading zone, by bringing a first constraining mechanism and/or a second constraining mechanism of a portioning unit into contact with the tray, in such a way that the movement of the tray is constrained at at least one position in the loading zone, wherein the first constraining mechanism and the second constraining mechanism can each be driven parallel to the conveying direction and orthogonally to the conveying direction, wherein the tray receives a food product when its movement is interrupted.

By selectively constraining the movement of a respective tray being moved into the loading zone, by bringing a first constraining mechanism and a second constraining mechanism into contact with it, the method utilizes the advantages initially mentioned in connection with the first aspect of the invention. Embodiments and advantages mentioned in relation to the first aspect of the invention, are therefore likewise advantages and preferred embodiments of the method according to the third aspect of the invention, and vice versa.

The method preferably also includes operating the first constraining mechanism and the second constraining mechanism in one, several or all of the following operating modes, depending on the number of food products to be portioned:

in a first operating mode in which the first constraining mechanism constrains and/or interrupts the movement of a tray at a first position for receiving a food product, in the event that a food product is to be portioned into the tray;

in a second operating mode in which the first constraining mechanism constrains and/or interrupts the movement of a first tray at a first position for receiving a first food product, and the second constraining mechanism constrains and/or interrupts the movement of the first tray at a second position for receiving a second food product, in the event that two food products are to be portioned into the trays; in a third operating mode in which the first constraining mechanism constrains and/or interrupts, in a predefined number of cycles, the movement of a first tray at a number of positions for receiving a corresponding number of food products, and the second constraining mechanism constrains and/or interrupts, in a predefined number of cycles, the movement of a second tray at a number of positions for receiving a corresponding number of food products, in the event that a plurality of food products is to be portioned into the trays; and in a fourth operating mode in which the first constraining mechanism is moved in the conveying direction at a predefined speed which is slower than a conveying speed of the conveyor belt, and which continuously constrains the movement of a first tray in such a way that a plurality of food products is received in the first tray.

The method preferably also includes the step of moving the tray constrained in its movement in the loading zone by the first constraining mechanism and/or the second constraining mechanism in the opposite direction to the conveying direction after receiving a first food product, so as to receive a second food product placed at least partially on top of the first food product.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one of more embodiments of the invention and, together with the general description given above and the detailed description given below, explain the one or more embodiments of the invention.

DETAILED DESCRIPTION

Figure 1:
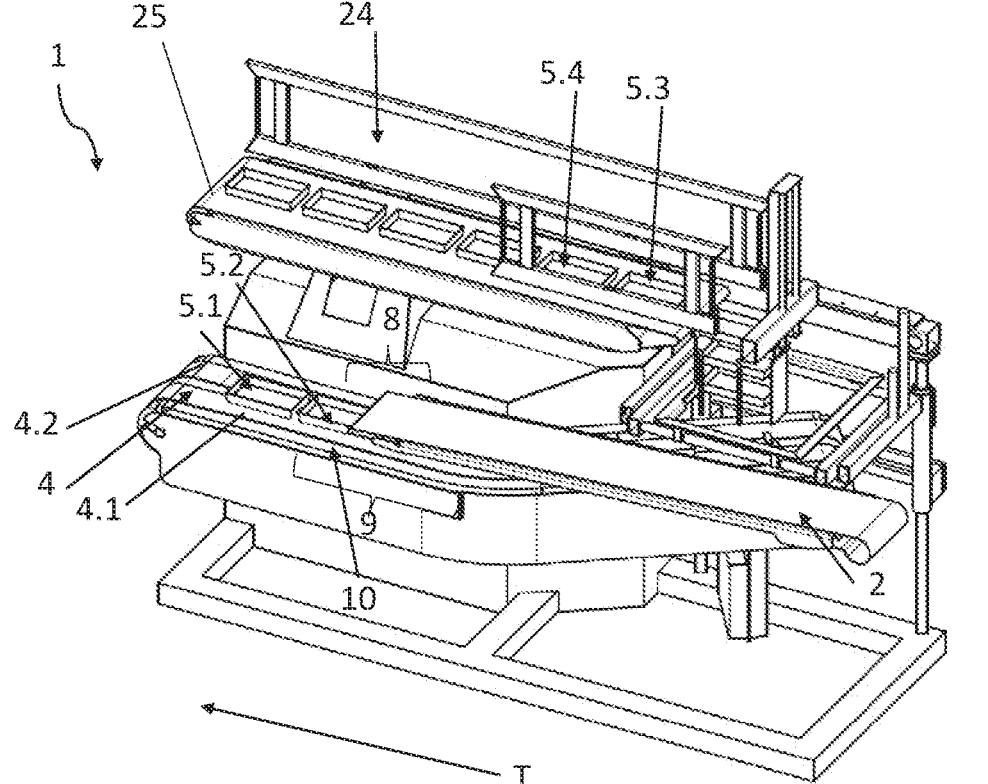
FIG. 1 shows a loading device according to a preferred embodiment.

FIG. 1 shows a loading device 1 having a feeder belt 2 which is configured to receive food products 3 (not shown, cf. FIG. 2), and a conveyor belt 4 which is configured to move in a conveying direction T.

Conveyor belt 4 includes a first belt section 4.1 and a second belt section 4.2, which are spaced apart from each other and are each configured to move in conveying direction T.

Feeder belt 2 is configured to convey the food products 3 into a transfer zone 8. In the view shown here, a first and a second tray 5.1, 5.2 are first of all conveyed on conveyor belt 4. Conveyor belt 4 is configured to move trays 5.1, 5.2, 5.3, 5.4 into a loading zone 9 arranged below transfer zone 8. Trays 5.1, 5.2, 5.3, 5.4 are preferably moved by conveyor belt 4 in a conveying plane E.

In the view shown here, a third and fourth tray 5.3, 5.4 are fed to conveyor belt 4 by a feeder device 24 arranged above the latter and having its own feeder conveyor belt 25. The third and fourth trays 5.3, 5.4 are conveyed by feeder conveyor belt 25 to conveyor belt 4 via feeder device 24 and arrive, like the first and second tray 5.1, 5.2 by means of conveyor belt 4, in loading zone 9 and thus below transfer zone 8, in such a way that food products 3 (not shown) reach an end of feeder belt 2 in transfer zone 8. Feeder belt 2 is deflected at that end, and food products 3 drop down into trays 5.1, 5.2, 5.3, 5.4. Loading device 1 further comprises a portioning unit 10 which is designed for portioning food products 3 into trays 5.1, 5.2, 5.3, 5.4 in loading zone 9.

Portioning unit 10 is arranged below conveying plane E and is shown in detail in FIG. 3. Portioning unit 10 is preferably arranged, at least in sections thereof, between the first belt section 4.1 and the second belt section 4.2, wherein the first belt section 4.1 and the second belt section 4.2 are spaced apart from each other in conveying plane E orthogonally to conveying direction T.

Figure 2:
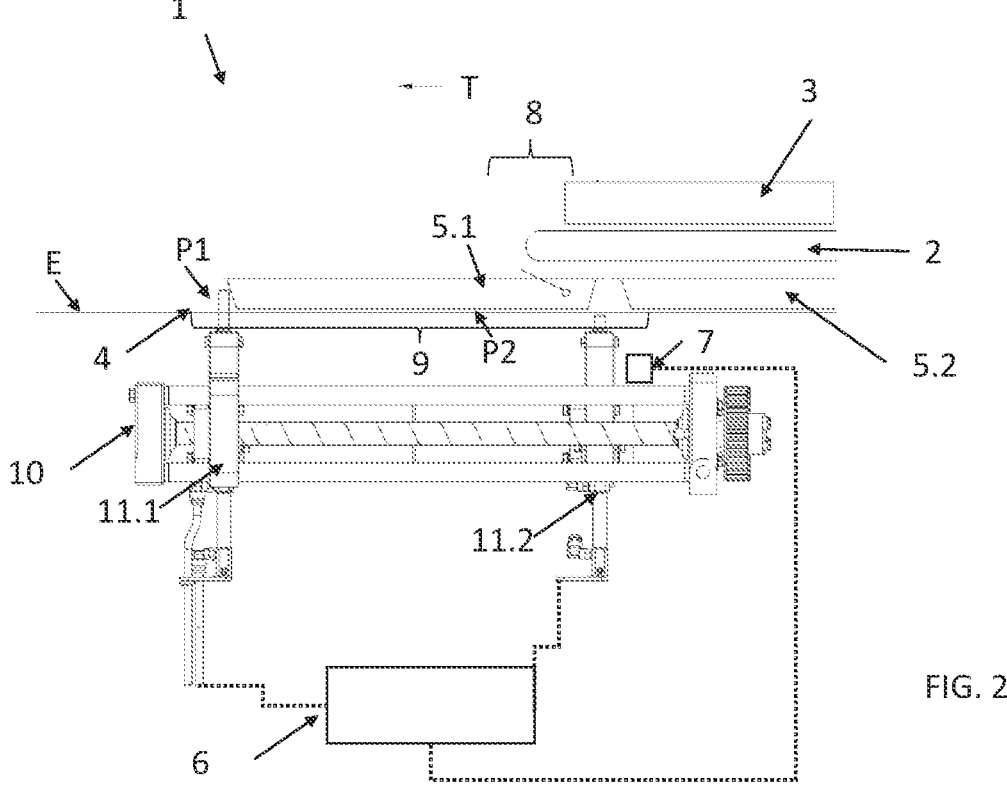
FIG. 2 shows a detail of a loading device 1 as shown in FIG. 1.

FIG. 2 shows a detail of a loading device 1 as shown in FIG. 1, for example, having a feeder belt 2 configured to receive food products 3, and a conveyor belt 4 configured to move trays 5.1, 5.2, 5.3, 5.4 in a conveying direction T. Loading device 1 preferably also includes a control unit 6 and a sensor 7 in signal communication with control unit 6. Feeder belt 2 is configured to convey the food products 3 in a transfer zone 8, and conveyor belt 4 is configured to move trays 5.1, 5.2, 5.3, 5.4 into a loading zone 9 arranged below transfer zone 8.

Trays 5.1, 5.2 on conveyor belt 4 are preferably moved by conveyor belt 4 in a conveying plane E, with a portioning unit 10 being arranged below conveying plane E. Trays 5.1, 5.2 are moved by conveyor belt 4 into loading zone 9 and thus below transfer zone 8 in such a way that the food products 3 in transfer zone 8 reach an end of feeder belt 2, where feeder belt 2 is deflected, and drop down into trays 5.1, 5.2. Feeder belt 2 may also be a shuttle conveyor that, by controlled movement in the opposite direction to conveying direction T, allows food products 3 to drop almost vertically into trays 5.1, 5.2 on conveyor belt 4. Loading device 1 further comprises portioning unit 10, which is configured for portioning food products 3 into trays 5.1, 5.2, 5.3, 5.4 in loading zone 9.

Sensor 7 is preferably designed to detect a tray 5.1, 5.2, 5.3, 5.4 moving into loading zone 9. Sensor 7 preferably detects a distance between the first tray 5.1 and the second tray 5.2 adjacent thereto in loading area 9. Such a sensor 7 may be a photoelectric barrier, for example, which detects an object entering the photoelectric barrier and accordingly a distance between two adjacent trays 5.1, 5.2 based on the "non-presence" of an object in the photoelectric barrier. Control unit 6 is preferably configured to control portioning unit 10 according to the signal from sensor 7. Control unit 6 preferably also controls feeder belt 2 and conveyor belt 4 in such a way that portioning unit 10, feeder belt 2 and conveyor belt 4 are controlled in a co-ordinated manner.

Figure 3:
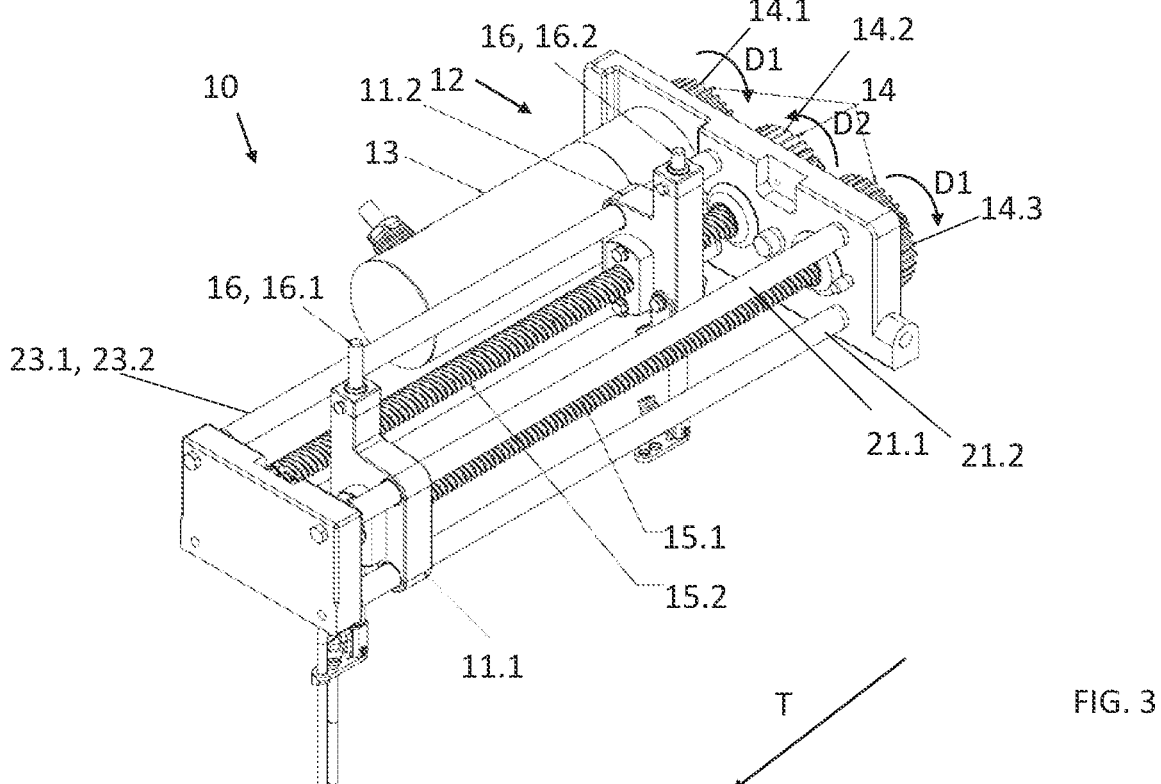
FIG. 3 shows a perspective view of a portioning unit for a loading device as shown in FIGS. 1 and 2.
Figure 4:
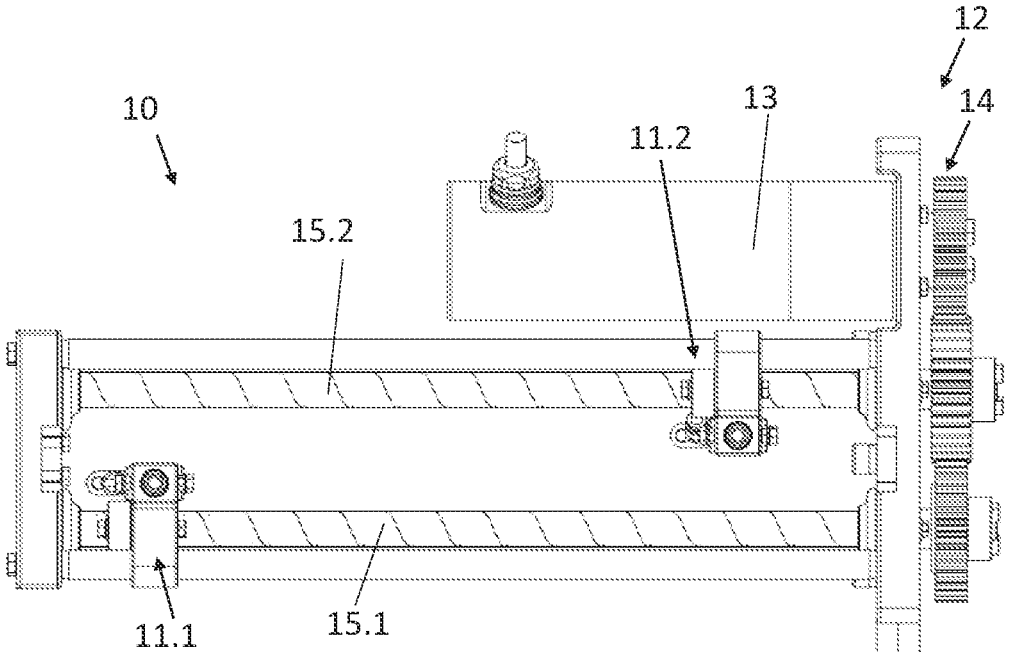
FIG. 4 shows a top view of the portioning unit as shown in FIG. 3.

Portioning unit 10 is shown in detail in FIG. 3 and FIG. 4. Portioning unit 10 includes a first constraining mechanism 11.1 and a second constraining mechanism 11.2, which are configured to be driven parallel to conveying direction T and orthogonally to conveying direction T so as to come sequentially into contact with a tray 5.1 being moved in loading zone 9. The first constraining mechanism 11.1 and the second constraining mechanism 11.2 are driven in such a way that movement of tray 5.1 is constrained at at least one position P1.

FIG. 2 shows the first constraining mechanism 11.1 in a position where it contacts tray 5.1 at the first position P1, after being controlled to move orthogonally to the conveying direction T. Movement of tray 5.1 is therefore constrained at position P1, whereby constraining movement is to be understood as slowing down or even completely interrupting a movement.

The portioning unit 10 shown in detail in FIG. 3 and FIG. 4 further comprises a drive 12 which is configured to drive the first constraining mechanism 11.1 and the second constraining mechanism 11.2 parallel to the conveying direction T. Drive 12 comprises a motor 13 and a transmission 14 that co-operates with motor 13.

Transmission 14 is designed here as a gear wheel drive 14 which is operatively connected to motor 13. Motor 13 is preferably a servomotor.

Portioning unit 10 also includes a first threaded spindle 15.1 in engagement with the first constraining mechanism 11.1 and a second threaded spindle 15.2 in engagement with the second constraining mechanism 11.2. The first threaded spindle 15.1 and the second threaded spindle 15.2 are driven by gear wheel drive 14 and are designed to translate a rotational movement produced by motor 13 into a linear movement of the first constraining mechanism 11.1 and the second constraining mechanism 11.2 parallel to the conveying direction T.

Gear wheel drive 14 includes a first gear wheel 14.1 operatively connected to servomotor 13 in such a way that the first gear wheel 14.1 is driven by servomotor 13 in a first rotational direction D1. Gear wheel drive 14 also includes a second gear wheel 14.2 which is operatively connected in engagement with the first gear wheel 14.1 in such a way that the second gear wheel 14.2 rotates in a second rotational direction D2 opposite to that of the first rotational direction D1. The second gear wheel 14.2 is in engagement with a third gear wheel 14.3 in such a way that rotation of the second gear wheel in the second rotational direction D2 cause the third gear wheel 14.3 to rotate in the opposite first rotational direction D1. Due to the first threaded spindle 15.1 being coupled to the third gear wheel 14.3, the first threaded spindle 15.1 rotates in conjunction with the third gear wheel 14.3 in the first rotational direction D1. Due to the second threaded spindle 15.2 being coupled to the second gear wheel 14.2, the second threaded spindle 15.2 rotates in conjunction with the second gear wheel in the second rotational direction D2 opposite to the first rotational direction D1. The first threaded spindle 15.1 and the second threaded spindle 15.2 are thus driven in opposite directions by gear wheel drive 14. Movement of the first constraining mechanism 11.1 in a direction opposite to conveying direction T is therefore accompanied by movement of the second constraining mechanism 11.2 in conveying direction T, and vice versa. It should be understood in this regard that the first rotational direction D1 and the second rotational direction D2 can also be in opposite directions, depending on the direction in which servomotor 13 is driven.

Portioning unit 10 also includes a lifting unit 16 which is configured to drive the first constraining mechanism 11.1 and the second constraining mechanism 11.2 orthogonally to conveying direction T. In the embodiment shown, lifting unit 16 comprises a first lifting unit 16.1 for driving the first constraining mechanism 11.1 orthogonally to conveying direction T and a second lifting unit 16.2 for driving the second constraining mechanism 11.2 orthogonally to conveying direction T.

Figure 5:
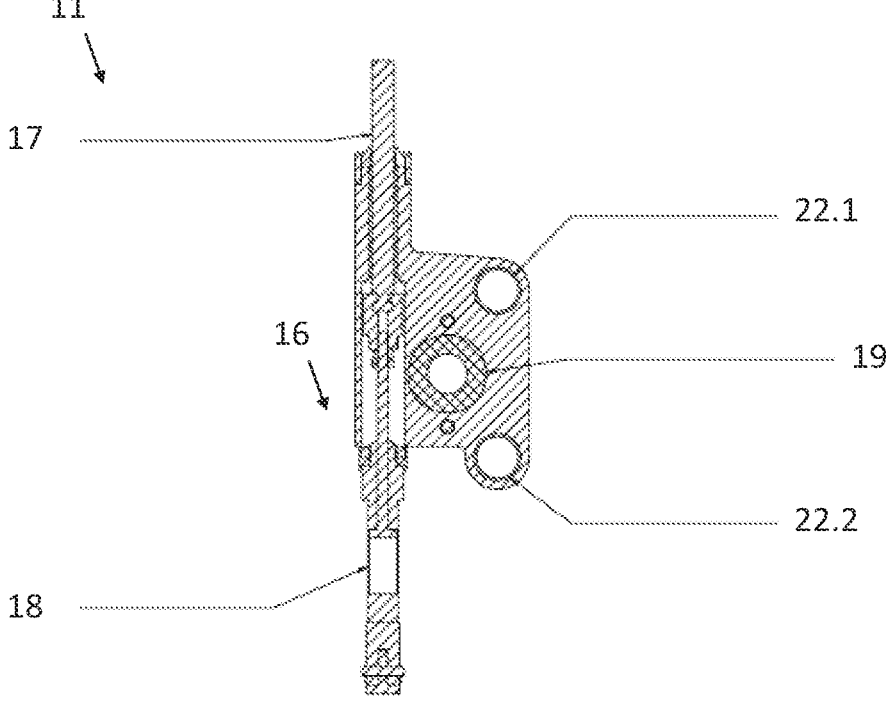
FIG. 5 shows a lifting unit for a portioning unit as shown in FIGS. 3 and 4.

Constraining mechanism 11, having a lifting unit 16, is shown in detail and by way of example in FIG. 5. Lifting unit 16 includes a tappet 17 which is configured to come into contact with a tray 5.1, 5.2, and an actuator 18 which co-operates with tappet 17. Actuator 18 is a pneumatic cylinder, for example.

As shown in FIG. 5, in particular, constraining mechanism 11 has a threaded nut 19 which is adapted to engage with the first threaded spindle 15.1 or the second threaded spindle 15.2. Constraining mechanism 11 also includes a pair of sliding bushings 22.1, 22.2 which are adapted to engage with a corresponding pair of guide slide rails 21.1, 21.2. Guide slide rails 21.1, 21.2 extend in conveying direction T and are adapted to guide the movement of constraining mechanism 11 in the conveying direction.

Accordingly, portioning unit 10 also has a pair of second guide slide rails 23.1, 23.2 for guiding the second constraining mechanism 11.2, whereby one of the guide slide rails 23.2 is not visible in the view shown.

Figures 6, 7:
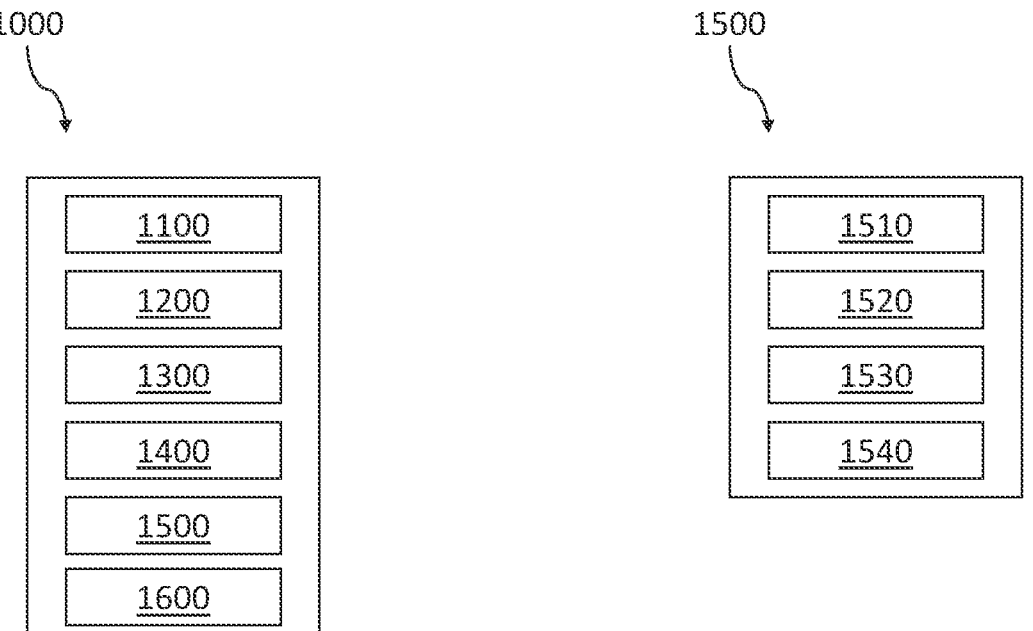
FIG. 6 shows a flow diagram of a method of operating a loading device as shown in FIGS. 1 and 2.
FIG. 7 shows a flow diagram of substeps of the method as shown in FIG. 6.

FIG. 6 shows a method 1000 of operating a loading device 1 as shown in FIG. 1 and FIG. 2.

The first step 1100 of method 1000 involves receiving food products 3 from a feeder belt 2.

The second step 1200 of method 1000 involves conveying food products 3 into a transfer zone 8.

The third step 1300 of method 1000 involves driving a conveyor belt 4 in a conveying direction T to receive trays 5.1, 5.2, and the fourth step 1400 involves moving trays 5.1, 5.2 into a loading zone 9 by means of conveyor belt 4, wherein loading zone 9 is arranged below transfer zone 8.

The fourth step 1400 involves transferring the food products 3 in transfer zone 8 to the tray 5.1 conveyed by conveyor belt 4. The fifth step 1500 of method 1000 involves selectively constraining the movement of a respective tray 5.1 being moved into loading zone 9, by bringing a first constraining mechanism 11.1 and/or a second constraining mechanism 11.2 of portioning unit 10 (cf. FIGS. 3 - 5) into contact with tray 5.1. The first constraining mechanism 11.1 and/or the second constraining mechanism 11.2 is brought into such contact in such a way that movement of tray 5.1 is constrained at at least a position P1 (cf. FIG. 2) in loading zone 9.

In a sixth step, method 1000 preferably involves moving the tray 5.1, 5.2 constrained in its movement in loading zone 9 by the first constraining mechanism 11.1 and/or by the second constraining mechanism 11.2 in the opposite direction to conveying direction T after receiving a first food product 3, so as to receive a second food product 3 placed on top of the first food product 3.

FIG. 7 shows preferred substeps of the fifth step 1500 according to method 1000. Selectively constraining the movement of a respective tray 5.1 moved into loading zone 9 in the fifth step 1500 involves operating different operating modes.

In a first operating mode in step 1510, portioning unit 10 is operated in such a way that the first constraining mechanism 11.1 constrains the movement of a first tray 5.1 at a first position Pl for receiving a first food product, in the event that only a single food product 3 is to be portioned into tray 5.1.

In a second operating mode in step 1520, portioning unit 10 is operated in such a way that the first constraining mechanism 11.1 constrains the movement of a first tray 5.1 at a first position P1 for receiving a first food product 3, and the second constraining mechanism 11.2 is operated in such a way that it constrains the movement of the first tray 5.1 at a second position P2 for receiving a second food product 3. Portioning unit 10 is operated in the second operating mode according to step 1520 if two food products 3 are to be portioned into trays 5.1, 5.2.

If the portioning unit 10 according to step 1530 is operated in a third operating mode, the first constraining mechanism 11.1 constrains, in a predefined number of cycles, the movement of a first tray 5.1 at a number of positions (not shown) for receiving a corresponding number of food products 3, and the second constraining mechanism 11.2 constrains, in a predefined number of cycles, the movement of a second tray 5.2 at a number of positions (not shown) for receiving a corresponding number of food products 3. Operation in the third operating mode is carried out in the event that a plurality of more than two food products is to be portioned into the trays.

According to step 1540, portioning unit 10 can be operated in a fourth operating mode in which the first constraining mechanism 11.1 is moved in conveying direction T at a predefined speed, wherein the predefined speed is slower than a conveying speed of conveyor belt 4. The movement of a first tray 5.1 is continuously constrained in such a way that a plurality of food products 3 is received in the first tray 5.1.

The embodiments described above are only descriptions of preferred embodiments of the present invention, and are not intended to limit the scope of the present invention. Various variations and modifications can be made to the technical solution of the present invention by those of ordinary skills in the art, without departing from the present invention. The variations and modifications should all fall within the claimed scope defined by the claims of the present invention.

What is claimed is:

1. A loading device for portioning food products into trays, comprising:
    a feeder belt which is configured to receive food products and to convey the food products into a transfer zone;
    a conveyor belt which is designed to move the trays in a conveying direction and to convey the trays into a loading zone below the transfer zone, wherein the feeder belt is designed to transfer the food products in the transfer zone to the trays in the loading zone; and
    a portioning unit which is designed for portioning the food products into the in the loading zone,
    wherein the portioning unit has a first constraining mechanism and a second constraining mechanism which are configured to be driven, in each case parallel to the conveying direction and orthogonally to the conveying direction, so as to come sequentially into contact with a tray being moved into the loading zone, in such a way that the movement of the tray is constrained at at least one position in the loading zone.

2. The loading device of claim 1, wherein the conveyor belt is configured to convey the trays in a conveying plane, and the portioning unit is arranged below the conveying plane, and the first constraining mechanism and the second constraining mechanism are configured to be driven orthogonally to the conveying direction, for selective movement into the conveying plane.

3. The loading device of claim 1, wherein the portioning unit has at least one drive which is configured to drive the first constraining mechanism and/or the second constraining mechanism parallel to the conveying direction.

4. The loading device of claim 3, wherein the at least one drive includes a first drive which is configured to drive the first constraining mechanism and the portioning unit has a second drive which is configured to drive the second constraining mechanism parallel to the conveying direction.

5. The loading device of claim 3, wherein the at least one drive has a motor and a continuously variable transmission that co-operates with the motor.

6. The loading device of claim 5, wherein the continuously variable transmission includes at least one of the following:
    a gear wheel drive co-operating with the motor for driving a threaded spindle operatively connected to the first constraining mechanism and/or the second constraining mechanism and
    a toothed belt drive operatively connected to the first constraining mechanism and/or the second constraining mechanism.

7. The loading device of claim 6, wherein the threaded spindle is a first threaded spindle and in engagement with the first constraining mechanism, and the portioning unit also has a second threaded spindle in engagement with second constraining mechanism, wherein the gear wheel drive is designed to drive the first threaded spindle and the second threaded spindle in opposite directions.

8. The loading device of claim 1, wherein the portioning unit has at least one lifting unit which is configured to drive the first constraining mechanism and/or the second constraining mechanism orthogonally to the conveying direction.

9. The loading device of te claim 8, wherein the at least one lifting unit has an actuator, and the first constraining mechanism and/or the second constraining mechanism also has a tappet which co-operates with the actuator and can be moved by the actuator orthogonally to the conveying direction.

10. The loading device of claim 1, further comprising:
    a control unit in control communication with the portioning unit and configured to control the movement of the first constraining mechanism and the second constraining mechanism parallel to the conveying direction and/or orthogonally to the conveying direction.

11. The loading device of claim 10, further comprising:
    at least one sensor connected to the control unit and configured to detect a tray moving into the loading zone.

12. The loading device of claim 11, wherein the at least one sensor is configured to detect the tray moving into the loading zone by detecting a distance between two adjacent trays in the loading zone.

13. The loading device of claim 10, wherein the control unit is configured to operate the first constraining mechanism and the second constraining mechanism in one, several, or all of the following operating modes, depending on the number of food products to be portioned:
    in a first operating mode in which the first constraining mechanism constrains and/or interrupts the movement of the tray being moved into the loading zone at a first position for receiving a food product, in the event that a food product is to be portioned into the tray,
    in a second operating mode in which the first constraining mechanism constrains and/or interrupts the movement of the tray being moved into the loading zone at a first position or receiving a first food product, and the second constraining mechanism constrains and/or interrupts the movement of the tray, at a second position for receiving a second food product, in the event that two food products are to be portioned into the tray,
    in a third operating mode in which the first constraining mechanism constrains and/or interrupts, in a predefined number of cycles, the movement of a first tray at a number of positions for receiving a corresponding number of food products, and the second constraining mechanism constrains and/or interrupts, in a predefined number of cycles, the movement of a second tray at a number of positions for receiving a corresponding number of food products, in the event that a plurality of food products is to be portioned into the first tray and the second tray, and
    in a fourth operating mode in which the first constraining mechanism is moved in the conveying direction at a predefined speed which is slower than a conveying speed of the conveyor belt, and which continuously constrains the movement of the tray, being moved into the loading zone, in such a way that a plurality of food products is received in the tray.

14. A method of operating a loading device for portioning food products into trays, comprising:

providing the loading device of claim 1;

receiving food products on a feeder belt, conveying the food products into a transfer zone;

driving a conveyor belt in a conveying direction to receive trays;

moving the trays into a loading zone by the conveyor belt arranged below the transfer zone, wherein the food products in the transfer zone are transferred to the trays conveyed by the conveyor belt; and selectively constraining the movement of a respective tray being moved into the loading zone, by bringing a first constraining mechanism and/or a second constraining mechanism of a portioning unit into contact with the tray, in such a way that the movement of the tray is constrained at at least a second position in the loading zone, wherein the first constraining mechanism and the second constraining mechanism can each be driven parallel to the conveying direction and orthogonally to the conveying direction, wherein the tray receives a food product when its movement is interrupted.

15. The method of claim 14, wherein selectively constraining the movement of a respective tray being moved into the loading zone comprises:

operating the first constraining mechanism and the second constraining mechanism in one, several, or all of the following operating modes, depending on the number of food products to be portioned:

in a first operating mode in which the first constraining mechanism constrains and/or interrupts the movement of the tray being moved into the loading zone at a first position for receiving a food product, in the event that a food product is to be portioned into the tray, in a second operating mode in which the first constraining mechanism constrains and/or interrupts the movement of the tray being moved into the loading zone at a first position for receiving a first food product, and the second constraining mechanism constrains and/or interrupts the movement of the tray at a second position for receiving a second food product, in the event that two food products are to be portioned into the tray, in a third operating mode in which the first constraining mechanism constrains and/or interrupts, in a predefined number of cycles, the movement of a first tray at a number of positions for receiving a corresponding number of food products, and the second constraining mechanism constrains and/or interrupts, in a predefined number of cycles, the movement of a second tray at a number of positions for receiving a corresponding number of food products, in the event that a plurality of food products is to be portioned into the first tray and the second tray, and in a fourth operating mode in which the first constraining mechanism is moved in the conveying direction at a predefined speed which is slower than a conveying speed of the conveyor belt, and which continuously constrains the movement of the tray being moved into the loading zone, in such a way that a plurality of food products is received in the tray.

16. The method of claim 14, further comprising:

moving the tray constrained in its movement in the loading zone by the first constraining mechanism and/or the second constraining mechanism in the opposite direction to the conveying direction after receiving a first food product, so as to receive a second food product placed at least partially on top of the first food product.

\* \* \* \* \*